United States Patent
Georgy et al.

(10) Patent No.: US 10,082,583 B2
(45) Date of Patent: Sep. 25, 2018

(54) METHOD AND APPARATUS FOR REAL-TIME POSITIONING AND NAVIGATION OF A MOVING PLATFORM

(75) Inventors: Jacques Georgy, Calgary (CA); Christopher Goodall, Calgary (CA); Mohamed Atia, Calgary (CA); Walid Abdelfatah, Calgary (CA); Zhi Shen, Calgary (CA); Aboelmagd Noureldin, Calgary (CA); Husain Syed, Calgary (CA)

(73) Assignee: InvenSense, Inc., San Jose, CA (US)

(*) Notice: Subject to any disclaimer, the term of this patent is extended or adjusted under 35 U.S.C. 154(b) by 482 days.

(21) Appl. No.: 14/125,022

(22) PCT Filed: Jun. 8, 2012

(86) PCT No.: PCT/CA2012/000561
§ 371 (c)(1),
(2), (4) Date: Sep. 12, 2014

(87) PCT Pub. No.: WO2012/167367
PCT Pub. Date: Dec. 13, 2012

(65) Prior Publication Data
US 2015/0204983 A1    Jul. 23, 2015

Related U.S. Application Data

(60) Provisional application No. 61/495,120, filed on Jun. 9, 2011.

(51) Int. Cl.
*G01S 19/39* (2010.01)
*G01C 21/20* (2006.01)
*G01S 19/49* (2010.01)

(52) U.S. Cl.
CPC .............. *G01S 19/39* (2013.01); *G01C 21/20* (2013.01); *G01S 19/49* (2013.01)

(58) Field of Classification Search
None
See application file for complete search history.

(56) References Cited

U.S. PATENT DOCUMENTS

| 4,954,837 A * | 9/1990 | Baird | G01C 21/005 342/458 |
| 6,157,891 A * | 12/2000 | Lin | G01C 5/005 244/180 |

(Continued)

FOREIGN PATENT DOCUMENTS

| CA | 2126257 | 12/1994 |
| CA | 2466563 | 11/2004 |

(Continued)

OTHER PUBLICATIONS

CN101982732A English Translation.*

(Continued)

*Primary Examiner* — Rami Khatib
(74) *Attorney, Agent, or Firm* — Bay Area Technology Law Group PC

(57) ABSTRACT

A navigation module for providing a real-time INS/GNSS navigation solution for a moving object comprising a receiver for receiving absolute navigational information from an external source and an assembly of self-container sensors for generating navigational information. The module also contains a processor coupled to receive the output information from the receiver and sensor assembly, and integrate the output information in real-time to produce an overall navigation solution. The overall navigation solution will contain a main navigation solution task, and at least one other task, where the other task is used to enhance the overall navigation solution.

47 Claims, 6 Drawing Sheets

(56) References Cited

U.S. PATENT DOCUMENTS

| | | | | |
|---|---|---|---|---|
| 6,205,400 B1* | 3/2001 | Lin | | G01C 21/165 342/357.31 |
| 6,246,960 B1* | 6/2001 | Lin | | G01C 21/165 701/472 |
| 6,427,122 B1* | 7/2002 | Lin | | G01C 21/165 342/26 B |
| 6,449,559 B2* | 9/2002 | Lin | | G01C 21/165 342/357.31 |
| 6,512,976 B1* | 1/2003 | Sabatino | | G01C 21/005 342/357.36 |
| 7,151,999 B2* | 12/2006 | Neregard | | G01C 21/165 213/220 |
| 7,388,541 B1* | 6/2008 | Yang | | G01C 21/206 342/464 |
| 2007/0010936 A1 | 1/2007 | Nordmark et al. | | |
| 2009/0005986 A1* | 1/2009 | Soehren | | G01C 21/16 701/500 |
| 2010/0211316 A1 | 8/2010 | Da Silva et al. | | |
| 2011/0010027 A1* | 1/2011 | Patera | | B64G 1/24 701/13 |
| 2011/0208496 A1* | 8/2011 | Bando | | G01S 19/49 703/2 |
| 2012/0022784 A1* | 1/2012 | Louis | | G01C 21/005 701/445 |
| 2013/0293716 A1* | 11/2013 | Breed | | G01C 11/02 348/148 |
| 2014/0320310 A1* | 10/2014 | Steinhardt | | G01C 21/165 340/870.07 |

FOREIGN PATENT DOCUMENTS

| | | |
|---|---|---|
| CA | 2701529 | 4/2009 |
| CN | 101982732 A * | 3/2011 |

OTHER PUBLICATIONS

Jacques Georgy et al., "Low-Cost Three-Dimensional Navigation Solution for RISS/GPS Integration Using Mixture Particle Filter," IEEE Transactions on Vehicular Technology, vol. 59, No. 2 Feb. 2010.

* cited by examiner

METHOD AND APPARATUS FOR REAL-TIME POSITIONING AND NAVIGATION OF A MOVING PLATFORM

CROSS-REFERENCE

This application claims priority of U.S. Provisional Patent Application No. 61/495,120, filed Jun. 9, 2011.

TECHNICAL FIELD

The present technology relates to positioning and navigation systems implemented in a real-time system and adapted for use in environments with good, degraded, or denied satellite-based navigation signals.

BACKGROUND

The positioning of a moving object, such as a moving platform (e.g. a vessel, vehicle, wheel-based platform/vehicle, a person), or a device tethered or non-tethered within the moving platform, is commonly achieved using known reference-based systems, such as Global Navigation Satellite Systems (GNSS). GNSS comprises a group of satellites, that transmit encoded signals, and receivers on the ground that receive the signals, and by means of trilateration techniques, can be used to calculate position using the travel time of the satellites' signals and information about the satellites' current location.

Currently, the most popular form of GNSS for obtaining absolute position measurements is the global positioning system (GPS), which is capable of providing accurate position and velocity information about the moving object, provided that there is sufficient satellite coverage. However, where the satellite signal becomes disrupted or blocked such as, for example, in urban settings, tunnels and other GNSS-degraded or GNSS-denied environments, a degradation or interruption or "gap" in the GPS positioning information can result.

In order to achieve more accurate, consistent and uninterrupted positioning information, GNSS information may be augmented with additional positioning information obtained from complementary positioning systems. Such systems may be self-contained and/or "non-reference based" systems within the moving object, and thus need not depend upon external sources of information that can become interrupted or blocked.

One such "non-reference based" or relative positioning system is the inertial navigation system (INS). Inertial sensors are self-contained sensors within the moving object that use gyroscopes to measure the object's rate of rotation/angle, and accelerometers to measure the object's specific force (from which acceleration is obtained). Using initial estimates of position, velocity and orientation angles of the moving object as a starting point, the INS readings can subsequently be integrated over time and used to determine the current position, velocity and orientation angles of the moving object. Typically, measurements are integrated once for gyroscopes to yield orientation angles and twice for accelerometers to yield position of the moving object incorporating the orientation angles. Thus, gyroscope measurements will undergo a triple integration operation during the process of yielding position. Inertial sensors alone, however, are unsuitable for accurate positioning because the required integration operations of data results in positioning solutions that drift with time, thereby leading to an unbounded accumulation of errors.

Given that each positioning technique described above (GNSS and INS) may suffer loss of information or errors in data, common practice involves integrating the information/data obtained from the GNSS with that of the complementary INS system. For instance, to achieve a better positioning solution, INS and GPS data may be integrated because they have complementary characteristics. INS readings are accurate in the short-term, but their errors increase without bounds in the long-term due to inherent sensor errors. GNSS readings are not as accurate as INS in the short-term, but GNSS accuracy does not decrease with time, thereby providing long-term accuracy. Also, GNSS may suffer from outages due to signal blockage, multipath effects, interference or jamming, while INS is immune to these effects.

The integration of INS and GNSS rely on a filtering technique or a state estimation technique such as, for example, Kalman filter (KF), Linearalized KF (LKF), Extended KF (EKF), Unscented KF (UKF), and Particle filter (PF) among others.

The KF estimates the system state at some time point and then obtains observation "updates" in the form of noisy measurements. As such, the equations for the KF fall into two groups:

Time update or "prediction" equations: used to project forward in time the current state and error covariance estimates to obtain an a priori estimate for the next step, or Measurement update or "correction" equations: used to incorporate a new measurement into the a priori estimate to obtain an improved posteriori estimate.

Ideally, the integration of INS and GNSS information can occur almost immediately following the receipt of the information and its transfer to the processor, thereby providing a real-time navigation solution. What enables this is that the information received by the GNSS receiver is timed stamped with a pulse signal (such as, for example, a Pulse Per Second (PPS) signal or any other pulsing signal coming from the GNSS receiver) that denotes the time at which the GNSS information should have ideally been at the processor, and the processor can utilize the pulse signal to time-stamp and "link-up" the incoming GNSS information with the appropriate INS information to create a real-time solution.

Theoretically, the GNSS information is time-stamped at the instant when the pulse signal is generated, and in INS/GNSS integration, the GNSS update (i.e. the point at which the GNSS or absolute information is used as a measurement update in the state estimation technique or integration filter) should happen at the same time that the pulse occurs, or in other words should ideally happen at the state of the moving object when the pulse occurs. This is only possible in an ideal scenario where the GNSS information reaches the integration together with the pulse signal. In such scenarios, the GNSS measurement update would be received and processed by the processor before the processor uses the prediction based upon new inertial data.

Problems in real-time systems arise, however, in circumstances where the GNSS information reaches the processor later than the pulse signal, making it difficult to accurately link up the GNSS information with the INS information being updated. This is because the real-time INS/GNSS integrated system needs to output a real-time output at the high rate, and the prediction phase has to be performed using the real-time high rate input from the inertial sensors as soon as it is received by the processor, without waiting for the delayed GNSS information.

The GNSS information can be delayed for a number of reasons, such as:

GNSS receiver processing time (i.e. the time required by the GNSS receiver to perform the necessary calculations on the information received). This time can vary depending upon the type and speed of GNSS technique used, such as, for example, single point, differential, real-time kinematics (RTK) and precise point positioning (PPP). The calculations that need to be performed in each case will differ, and thus, the duration needed will also differ; and Transmission time (i.e. the time required to prepare the data for transmission and to transmit the GNSS information from the GNSS receiver to the processor).

Delays that may happen on the processor that will run the navigation algorithm that can make the navigation solution to receive the GNSS information later, one example of such delays may happen if this processor is running other applications.

As a result, the high-rate data from the inertial sensors, which is transmitted from the sensor assembly after the pulse signal for the GNSS data is generated, ends up being received by the processor before the GNSS data. Thus, the processor receives the pulse signal, the new high rate inertial sensor information and then the GNSS information.

In other words, problems with current real-time navigational solutions comprise:

a delay in transmission between the GNSS (absolute) navigational information compared to its corresponding time-stamp pulse signal and its subsequent usage for measurement update has to be delayed when the data reaches the integrated navigation processor. The update should ideally occur at the time that the pulse signal is generated (i.e. before the high-rate inertial sensor data that arrived after the pulse signal but before the delayed GNSS information arrived). In order to keep the physical and mechanical aspect of the true motion that happened in the real-life situation correct, the GNSS measurement update should happen before using prediction based on the inertial data that arrived after the pulse signal; and the need for a system that is capable of receiving and processing information at the high rate of the inertial sensors, thereby providing a real-time periodic navigation output. This means that the prediction phase has to be performed using the real-time high rate input from inertial sensors as soon as it arrives and this solution needs to be output without waiting for any other event to happen.

There is a need, therefore, for a apparatus and method of providing a real-time navigation solution about a moving object that is capable of rectifying the foregoing limitations and achieving the conflicting goals while not breaking the physical and mechanical aspects of the object's true motion.

SUMMARY

A navigation module for providing a real-time INS/GNSS navigation solution for a moving object is provided. This real-time solution can be used in different applications such as, for example, real-time control and guidance applications. A method of using the navigation module in real-time to determine an INS/GNSS navigation solution is also provided. The present module is able to deal with the real-time requirements mentioned in the background section, although these requirements are conflicting with each other.

The module comprises a receiver for receiving absolute navigational information about the moving object from an external source (e.g., such as a satellite), and producing an output of navigational information indicative thereof.

The module further comprises an assembly of self-contained sensors capable of obtaining readings (e.g., such as relative or non-reference based navigational information) and producing an output indicative thereof for generating navigational information. The sensor assembly may comprise accelerometers, gyroscopes, magnetometers, barometers, and any other self-contained sensing means that are capable of generating navigational information.

The module may further comprise means for obtaining speed or velocity information and producing an output of information indicative thereof.

Finally, the module further comprises at least one processor, coupled to receive the output information from the receiver, sensor assembly and optional means for obtaining speed or velocity information, and operative to integrate the output information in real-time to produce an overall navigation solution and output such a solution. The overall navigation solution may comprise multiple tasks. A task may be, for example, a routine, a thread, or a process. Multiple tasks may run: (i) on a single core or a single processor with context switching either by hardware or software, or (ii) on multiple cores or multiple processors. The latter is able to achieve hardware level parallelism, while the former has to use context switching to achieve a software level parallelism. The latter may also additionally use context switching, if needed. Context switching means either a register context switch, a thread context switch, or a process context switch. The multiple tasks may consist of: a main navigation solution, wherein the main navigation solution provides the real-time navigation output, and at least one other thread, wherein the at least one other thread is used to enhance the overall navigation solution.

The processor may be programmed to utilize a filtering technique or a state estimation technique, such as, for example a KF-based technique or a PF-based technique, and the integration of the information from different sources may be done in either loosely or tightly coupled integration schemes. The filtering algorithm may utilize a system model and a measurement model.

A method for determining a real-time navigation solution is further provided comprising the steps of:

a) receiving absolute navigational information from an external source and producing output readings indicative thereof;

b) obtaining readings relating to navigational information at self-contained sensors within the module and producing an output indicative thereof;

c) optionally obtaining speed or velocity information and producing output readings indicative thereof; and d) providing at least one processor for processing and filtering the navigational information and optional speed or velocity information to produce a real-time navigation solution relating to the module.

In one embodiment, the present module and method are capable of providing a navigation solution in real-time despite the fact that the absolute navigation information may be delayed, and the real-time solution output is not affected by such delay.

In another embodiment, the present module and method are capable of calculating attitude at a higher rate than position and velocity. Position and velocity can be at a high rate but lower than the attitude rate. This setting might be used by some control and guidance applications.

In another embodiment, the present module and method are capable of calculating a real-time navigation solution using a less complex state estimation or filtering technique and another background navigation solution that is more computationally complex and more accurate (at possibly a lower rate) and then uses the more accurate navigation solution as an update for the real-time solution.

In yet another embodiment, the present module and method are capable of calculating a real-time navigation solution and another background routine for running a backward smoothed solution on saved intervals of readings and then using it to enhance the real-time navigation solution.

In yet another embodiment, the present module and method are capable of calculating a real-time navigation solution and another background routine that estimates slowly changing parameters or unknown a priori parameters used in the state estimation or filtering technique of the real-time navigation solution using saved intervals of readings to enhance the real-time navigation solution.

It should be noted that the different embodiments of the present module and method of obtaining a real-time navigation solution, either alone, together or in any combination thereof, provide means to improve the navigation solution.

Broadly stated, in some embodiments, a navigation module for providing an overall navigation solution that provides a real-time navigation output about a moving object is provided, the module comprising: a receiver for receiving absolute navigational information about the object from an external source, and producing an output of navigational information indicative thereof, an assembly of self-contained sensors capable of obtaining readings relating to navigational information and producing an output indicative thereof, and at least one processor, coupled to receive the navigation information and readings from the sensor assembly, and operative to integrate the information in real-time and to produce the overall navigation solution and output said solution. The present module may optionally comprise means for obtaining speed information and producing and output indicative thereof, whereby the processor may utilize said speed information to produce the navigation solution.

Broadly stated, in some embodiments, a method of producing an overall navigation solution that provides a real-time navigation output about a moving object is provided, the method comprising the steps of: providing a receiver for receiving absolute navigational information about the object from an external source, and producing an output of navigational information indicative thereof, providing an assembly of self-contained sensors capable of obtaining readings relating to navigational information and producing an output indicative thereof, and providing at least one processor, coupled to receive the navigation information and readings from the sensor assembly, wherein the processor operates to integrate the information in real-time and to produce the overall navigation solution and output said solution. The present method may optionally comprise providing means for obtaining speed information and producing and output thereof, whereby the processor may utilize said speed information to produce the navigation solution.

DESCRIPTION OF THE PREFERRED EMBODIMENTS

An improved navigation module and method for providing a real-time INS/GNSS navigation solution for a moving object is provided. More specifically, the present navigation module and method for providing a navigation solution attempts to address known problems that: (i) absolute navigational information (e.g. GNSS) is received by the processor later than the pulse on the pulsing signal, resulting in delayed usage of the GNSS information for measurement updates, rather than at the time when the pulse occurs when it should be used (i.e. before the high rate sensor data that arrived in between the pulse arrival and the actual absolute navigational information data arrival); and (ii) the high rate sensors output arriving at real-time and the need to process them and provide a real-time periodic navigation output that is not contingent on any other phenomenon.

Navigation Module

Figure 1:
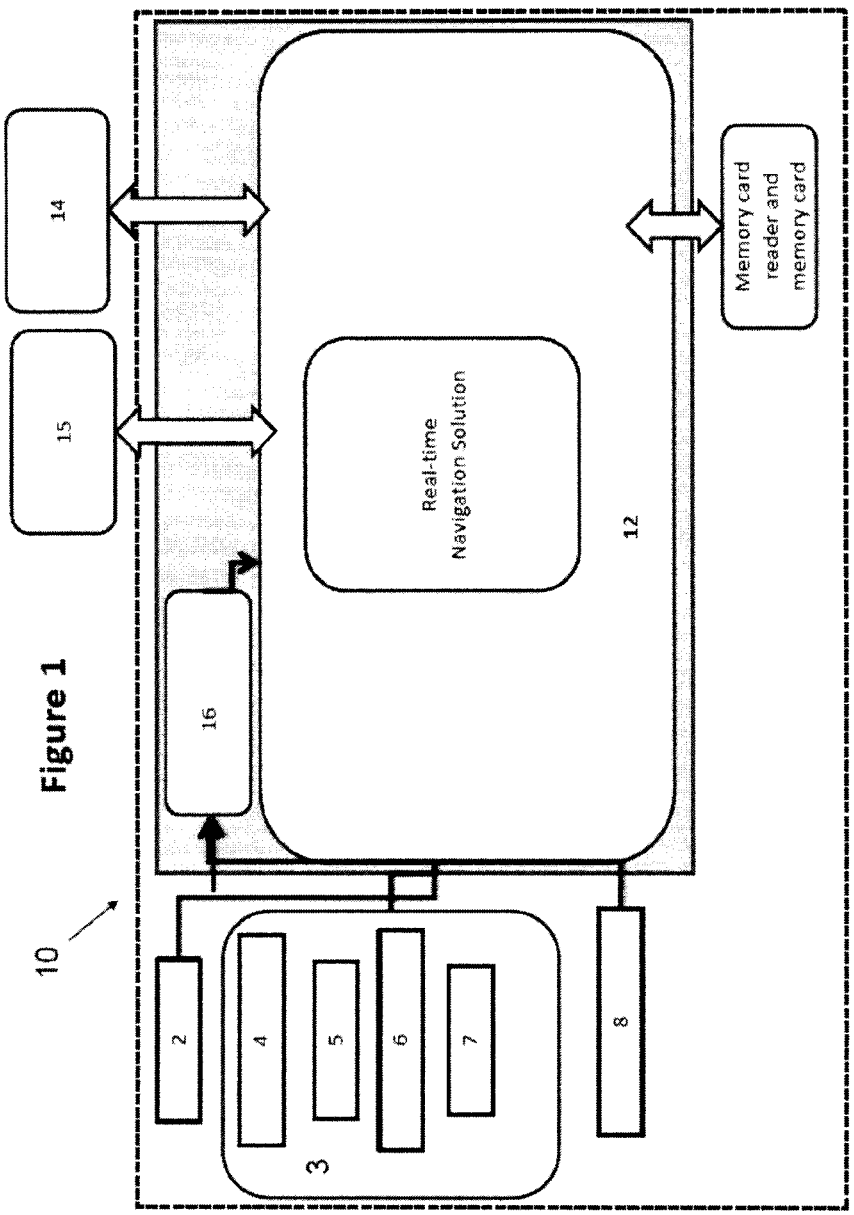
FIG. 1 shows a flow-chart depicting the present navigation module.

Having regard to FIG. 1, the present navigation module 10 may comprise a receiver 2 capable of receiving "absolute" or "reference-based" navigation information about a moving object from external sources, such as satellites, whereby the receiving means is capable of producing an output indicative of the navigation information and a corresponding time-dependent pulse signal. The time-dependent pulse signal corresponds to the time the raw absolute navigational information is received by the receiver from the external source. For example, the receiver means may be a GNSS receiver capable of receiving navigational information from GNSS satellites and converting the information into position and velocity information about the moving object. The GNSS receiver may also provide navigation information in the form of raw measurements such as pseudoranges and Doppler shifts. The GNSS receiver might operate in one of different modes, such as, for example, single point, differential, RTK, PPP, or using wide area differential (WAD) corrections (e.g. WAAS).

In one embodiment, the GNSS receiver may be a Global Positioning System (GPS) receiver, such as a NovAtel OEMV3 receiver module. It is to be understood that any brand and model of receivers may be used including, for example and without limitation, a NovAtel OEM4, a Trimble BD982, a Hemisphere Crescent vector II, or a u-blox LEA-6T GPS receiver, which is a single frequency low-end receiver with access to GPS only.

The present navigation module 10 may also comprise a self-contained sensor assembly 3, capable of obtaining or generating "relative" or "non-reference based" readings relating to navigational information about the moving object, and producing an output indicative thereof. The sensor assembly 3 may, for example, consist of at least one accelerometer 4, for measuring acceleration rates, and at least one gyroscope 5, for measuring turning rates of the moving object. Optionally, the sensor assembly 3 may comprise other self-contained sensors such as, without limitation, three dimensional (3D) magnetometer 6, for measuring magnetic field strength for establishing heading, barometer 7, for measuring pressure to establish altitude, or any other sources of "relative" navigational information.

In one embodiment, the sensor assembly 3 may comprise an orthogonal triad of accelerometers 4 and gyroscopes 5. The sensor assembly 3 may comprise orthogonal Micro-Electro-Mechanical Systems (MEMS) accelerometers 4, and MEMS gyroscopes 4, such as, for example, those obtained in one inertial measurement unit package from Analog Devices Inc. (ADI) Model No. ADIS16405, Model No. ADIS16375, or Model No. ADIS16385. The inertial sensors might be in different packages such as an accelerometer triad from Analog Devices Inc. (ADI) Model No. ADIS16240, and such as a gyroscope triad from Invensense Model No. ITG-3200. The sensor assembly 3 may or may not include orthogonal magnetometers 6 either available in the same package as the IMU or in another package such as, for example model HMC5883L from Honeywell, and barometers 7 such as, for example, (model MS5803) from Measurement Specialties.

Third, the present navigation module 10 may optionally comprise means for obtaining speed and/or velocity information 8 of the moving object, wherein said means are capable of further generating an output or "reading" indicative thereof. While it is understood that such means can be either speed and/or velocity information, said means shall only be referred to herein as "speed means".

In one embodiment, the speed means 8 may comprise an odometer, a wheel-encoder, a shaft or motor encoder of any wheel-based or track-based platform, or any other source of speed and/or velocity readings (for example, those derived from Doppler shifts of any type of transceiver). The speed means, such as the odometer, may be connected to the Controller Area Network (CAN) bus or the On Board Diagnostics version II (OBD-II) of the platform. It should be understood that the speed means for generating speed/velocity information about the moving platform may be connected to the navigation module via wired or wireless connection.

Finally, the present navigation module 10 may comprise at least one processor 12 or microcontroller coupled to the module 10 for receiving and processing the absolute navigational information output and corresponding time-dependent pulse signal received from the receiver 1 the readings received from the sensor assembly 3 and optionally the speed/velocity information from the speed means 8, and determining a real-time navigation solution about the moving object.

The processor is programmed to use known filtering or state estimation techniques to provide the real-time navigation solution. In one embodiment, the state estimation technique may be a KF-based technique. In another embodiment, the state estimation technique may be a PF-based technique.

The navigation solution determined by the present navigation module 10 may be communicated to a display or user interface 14. It is contemplated that the display 14 may be part of the module 10, or separate therefrom (e.g., connected wired or wirelessly thereto). The navigation solution determined in real-time by the present navigation module 10 may further be stored or saved to a memory device/card 16 operatively connected to the module 10.

The navigation solution determined by the present navigation module 10 may be communicated through output port 15, whereby the port 15 may be connected to another system that is capable of using the real-time navigation solution for real-time control and guidance.

In one embodiment, a single processor such as, for example, an ARM Cortex R4 or an ARM Cortex A8 may be used to integrate and process the signal information. In another embodiment, the signal information may initially be captured and synchronized by at least one first-stage processor such as, for example, an ST Micro (STM32) family or other known basic microcontroller, before being subsequently transferred to a second processor such as, for example, an ARM Cortex R4 or ARM Cortex A8 for higher level processing.

A method for determining a real-time navigation solution about a moving object is further provided, the method comprising the steps of:

a) receiving absolute navigational information from an external source and producing output readings indicative thereof and a corresponding time-dependent pulse signal. The pulse signal corresponds to the time the absolute navigational information was received;

b) obtaining readings relating to navigational information at self-contained sensors within the module and producing an output indicative thereof;

c) optionally obtaining speed or velocity information and producing output readings indicative thereof; and d) providing at least one processor for processing and filtering the navigational information and optional speed or velocity information to produce a real-time navigation solution relating to the module.

It is an object of the present navigation module 10 and method to produce two dimensional (2D) or 3D position, velocity and orientation information for any moving object that may be a moving platform is, for example, land-based, airborne or an underwater platform, or a device that is tethered or non-tethered within a moving platform. The word moving here means capable of motion. The moving platform could also be a person and the sensor assembly could be held or tethered to the person. Land-based platforms can be wheeled platforms such as automobiles, machinery with wheels, mobile robots and wheelchairs, or any non-wheeled system, such as for example track-based platforms or legged platforms.

It is known that there are three main types of INS/GNSS integration techniques that have been proposed to attain maximum advantage depending upon the type of use and choice of simplicity versus robustness. This leads to three main integration architectures:

1. Loosely coupled
2. Tightly coupled
3. Ultra-tightly coupled (or deeply coupled).

The first type of integration, which is called loosely coupled, uses an estimation technique to integrate inertial sensors data with the position and velocity output of a GNSS receiver. The distinguishing feature of this configuration is a separate filter for the GNSS. This integration is an example of cascaded integration because of the two filters (GNSS filter and integration filter) used in sequence.

The second type, which is called tightly coupled, uses an estimation technique to integrate inertial sensors readings with raw GNSS data (i.e. pseudoranges that can be generated from code or carrier phase or a combination of both, and pseudorange rates that can be calculated from Doppler shifts) to get the vehicle position, velocity, and orientation. In this solution, there is no separate filter for GNSS, but there is a single common master filter that performs the integration.

For the loosely coupled integration scheme, at least four satellites are needed to provide acceptable GNSS position and velocity input to the integration technique. The advantage of the tightly coupled approach is that less than four satellites can be used as this integration can provide a GNSS update even if fewer than four satellites are visible, which is typical of a real life trajectory in urban environments as well as thick forest canopies and steep hills. Another advantage of tightly coupled integration is that satellites with poor GNSS measurements can be detected and rejected from being used in the integrated solution.

For the third type of integration, which is ultra-tight integration, there are two major differences between this architecture and those discussed above. Firstly, there is a basic difference in the architecture of the GNSS receiver compared to those used in loose and tight integration. Secondly, the information from INS is used as an integral part of the GNSS receiver, thus. INS and GNSS are no longer independent navigators, and the GNSS receiver itself accepts feedback. It should be understood that the present navigation solution may be utilized in any of the foregoing types of integration.

Having regard to Example 1, the present navigation module 10 and method may operate to determine a real-time navigation solution about a moving object by calculating position, velocity and attitude of the moving object, wherein the navigation module 10 comprises absolute navigational information from a GNSS receiver 2, readings from a self-contained sensor assembly 3, and optionally speed readings from speed means 8. The solution is output in real-time at the high-rate provided by the sensor assembly 3 (e.g. accelerometers 4 and gyroscopes 5). In this Example 1, the GNSS data is received in the module 10 at a lower rate and with a delay.

Having regard to Example 2, the present navigation module 10 and method may operate to determine a real-time navigation solution about a moving object by calculating position, velocity and attitude of the moving object, wherein the navigation module 10 comprises absolute navigational information from a GNSS receiver 2, readings from a sensor assembly 3, and optionally speed readings from speed means 8. The attitude solution is output in real-time at the highest rate provided by the gyroscopes 5, while position and velocity are output in real-time but at a relatively lower rate (might still be higher-rate compared to GNSS) provided by the accelerometers 4 (or down sampled accelerometers). The GNSS data is received in the module 10 at a lower rate and with a potential delay.

Having regard to Example 3, the present navigation module 10 and method may operate to determine a real-time navigation solution about a moving object by calculating position, velocity and attitude of the moving object, wherein the navigation module 10 comprises absolute navigational information from a GNSS receiver 2, readings from a sensor assembly 3, and optionally speed information from speed means 8. The position, velocity and attitude are output in real-time at the high rate provided by the sensor assembly 3, or attitude is output at a higher rate compared to position and velocity. The GNSS data is received in the module 10 at a lower rate and with a potential delay. A faster solution is running to provide the real-time output which is based on a filter or state estimation technique with less complexity such as, for example, KF-based solution, while a more computationally complex solution and more accurate solution, such as, for example, a PF-based solution is running at a lower rate on the same processor or on another processor (that can communicate with the first processor) and its output is providing lower-rate updates to the main solution (the less computationally expensive one).

Having regard to Example 4, the present navigation module 10 and method may operate to determine a real-time navigation solution about a moving object by calculating position, velocity and attitude of the moving object, wherein the navigation module 10 comprises absolute navigational information from a GNSS receiver 2, readings from a sensor assembly 3, and optionally speed information from speed means 8. The position, velocity and attitude are output in real-time at the high rate provided by the sensor assembly 3 or attitude is output at a higher rate compared to position and velocity. The GNSS data is received in the module 10 at a lower rate and with a potential delay. A solution is running to provide the real-time output which is based on a filter or state estimation technique such as, for example, a KF-based solution, while all the sensors readings, absolute navigation information, optional speed or velocity readings and all the real-time navigation results are saved. A backward smoothed solution is run on the saved data in the background. This background processing can be running either on the same processor as the real-time processing or on another processor that can communicate with the first processor and can read the saved data from a shared location. The outcome of the backward processing solution can benefit the real-time navigation solution in its future runs (i.e. real-time run after the background routine has finished running), for example, by having better estimates for the sensors errors.

Having regard to Example 5, the present navigation module 10 and method may operate to determine a real-time navigation solution about a moving object by calculating position, velocity and attitude of the moving object, wherein the navigation module 10 comprises absolute navigational information from a GNSS receiver 2, readings from a sensor assembly 3, and optionally speed information from speed means 8. The position, velocity and attitude are output in real-time at the high rate provided by the sensor assembly 3 or attitude is output at a higher rate compared to position and velocity. The GNSS data is received in the module 10 at a lower rate and with a potential delay. A solution is running to provide the real-time output which is based on a filter or state estimation technique such as, for example, a KF-based solution, while all the sensors readings, absolute navigation information, optional speed or velocity readings and all the real-time navigation results are saved. In the background, a routine is run to simulate outages in the absolute navigational information and estimate the parameters of another instance of the state estimation technique used for the real-time navigation solution to optimize the accuracy and the consistency of the solution. The accuracy and consistency is assessed comparing the temporary background solution during the simulated outages to a reference solution. The reference solution may be one of the following examples: the absolute navigational information (e.g. GNSS), a forward integrated navigation solution integrating the available sensors with the absolute navigational information (e.g. GNSS) and possibly with the optional speed or velocity readings, a backward smoothed integrated navigation solution integrating the available sensors with the absolute navigational information (e.g. GNSS) and possibly with the optional speed or velocity readings. The background processing can be running either on the same processor as the real-time processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation.

It should be noted that the different embodiments of the present module and method of obtaining a real-time navigation solution, either alone, together or in any combination thereof, provide means to improve the navigation solution.

It is contemplated that the present navigation module 10 and method can be used with any type of state estimation technique or filtering technique, for example, linear or non-linear techniques alone or in combination.

It is contemplated that the sensor assembly 3 of the present navigation module 10 and method may comprise other sensors combinations than those expressly defined herein, including, for example, relying on a 2D dead reckoning, a full IMU, or any other sensor combination from the sensors assembly and/or optional speed or velocity readings.

It is contemplated that the present navigation module 10 and method be used in combination with any helper optional modules such as, without limitation, alignment modules, misalignment detection modules that calculates the orientation of the housing or frame of the sensor assembly within the frame of the moving platform, automatic zupt detection with its possible updates and inertial sensors bias recalculations, modules for advanced modeling and/or calibration of inertial sensors errors, the derivation of possible measurement updates for them from GNSS when appropriate, the automatic assessment of GNSS solution quality and detecting degraded performance, automatic switching between loosely and tightly coupled integration schemes, and automatic assessment of each visible GNSS satellite when in tightly coupled mode.

It is further contemplated that the present navigation module 10 and method can be used together with modeling and/or calibration for the other sensors in the sensor assembly 3, such as, for example the barometer 7 and magnetometer 6, or for the errors in the optional speed or velocity readings.

It is further contemplated that the other sensors in the sensor assembly 3 such as, for example, the barometer 7 (e.g. with the altitude derived from it) and magnetometer 6 (e.g. with the heading derived from it) can be used in one or more of different ways such as: (i) as control inputs to the system model of the filter; (ii) as measurement updates to the filter either by augmenting the measurement model or by having an extra update step; (iii) in the above contemplated routine for automatic GNSS degradation checking; (iv) in the above contemplated alignment procedure; (v) in the above contemplated misalignment procedure.

It is further contemplated that the sensor assembly 3 can be either tethered or non-tethered to the moving, platform.

It is further contemplated that the present navigation module 10 and method may use appropriate constraints on the motion of the platform such as adaptive Non-holonomic constraints, for example, those that keep a platform from moving sideways or vertically jumping off the ground. These constraints can be used as an explicit extra update or implicitly when projecting speed to perform velocity updates.

It is further contemplated that the present navigation module 10 and method can be further integrated with maps (such as steep maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, laser range finders, cameras and vision systems, or sonar systems. These new systems can be used either as an extra aid to enhance the accuracy of the navigation solution during the absolute navigation information problems (degradation or denial), or they can totally replace the absolute navigation information in some applications.

It is further contemplated that the present navigation module 10 and method, when working in a tightly coupled scheme need not be bound to utilizing pseudorange measurements (which are calculated from the code not the carrier phase, thus they are called code-based pseudoranges) and the Doppler measurements (used to get the pseudorange rates). The carrier phase measurements of the GNSS receiver can be used as well, for example: (i) as an alternate way to calculate ranges instead of the code-based pseudoranges, or (ii) to enhance the range calculation by incorporating information from both code-based pseudorange and carrier-phase measurements, such enhancements is the carrier-smoothed pseudorange.

It is further contemplated that the present navigation module 10 and method can also be used in a system that implements an ultra-tight integration scheme between a GNSS receiver and the other sensors and speed readings.

It is further contemplated that the present navigation module 10 and method can be used with various wireless communication systems that can be used for positioning and navigation either as an additional aid (that will be more beneficial when GNSS is unavailable) or as a substitute for the GNSS information (e.g. for applications where GNSS is not applicable). Examples of these wireless communication systems used for positioning are, such as, those provided by cellular phone towers, radio signals, television signal towers, WiFi, or Wimax. For example, for cellular phone based applications, an absolute coordinate from cell phone towers and the ranges between the indoor user and the towers may utilize the methodology described herein, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. These ideas are also applicable in a similar manner for other wireless positioning techniques based on wireless communications systems.

It is contemplated that the present navigation module 10 and method can use various types of inertial sensors, other than MEMS based sensors described herein by way of example.

Without any limitation to the foregoing, the present navigation module 10 and method of determining a real-time navigation solution are further described by way of the following examples.

EXAMPLES

Example 1—Real-Time Navigation System with GNSS Delays

In this example, the present navigation module operates to determine a real-time navigation solution by calculating position, velocity and attitude of a moving object, wherein the navigation module comprises absolute navigational information from a GNSS receiver and a timing pulse signal, and readings from a self-contained sensor assembly. The navigation module may or may not comprise speed means for providing speed/velocity information. The solution is output in "real-time", that is, at the high-rate at which the readings are provided by the inertial sensors (accelerometers and gyroscopes) included in the sensor assembly, notwithstanding that the GNSS data is received in the module at a lower rate and with a delay or latency.

In this example, it will be assumed that GNSS data is at a 1 Hz rate and the pulsing signal is adjusted to provide one pulse per second (PPS). This assumption may be applied to a GNSS receiver giving output at any other rate and having the pulsing signal to give pulses at the same output rate. The pulsing signal indicates the exact time where the GNSS data should have been referenced to, which is the time when the raw measurements were received by the receiver.

Generally, the present example demonstrates that where high rate readings from the sensor assembly are available, the state estimation or filtering technique will run a "prediction phase" to provide the real-time output. When the subsequent PPS pulse occurs (with the actual GNSS data corresponding to the PPS time arriving later), the present module and method will continue providing real-time prediction results, and will:

a) Start buffering all the high rate readings, which comprises saving the readings from the sensor assembly and any other available sensors, where available; and b) Saving the last state of the moving object just before the PPS pulse.

Depending on the inertial sensors' rate, at each time epoch the data is saved in a group corresponding to the particular epoch. Where other sensor data is available, the data received from them might have any other data rate lower or equal to the inertial sensors rate, and they will be buffered accordingly in addition to their real-time processing. When the GNSS data arrives, an update phase can be achieved, whereby the update phase corresponds to the state of the moving object at the time of the pulse in the PPS signal.

Thus, each of the following events occur without impacting upon the other:

(i) Prediction Phase:
Where high-rate readings are received from the sensor assembly, the prediction phase is run to provide real-time output. The prediction phase is a recursive operation that builds on the state of the moving object as determined in the previous real-time prediction phase. Incoming high rate data used in real-time will be buffered to amend the already buffered data since the last PPS:

(ii) The buffered data since the last PPS pulse has to be used as follows:

(a) the very first buffered sensors' readings at the first time epoch is used for another prediction step starting from the state of the moving object that was saved when the PPS pulse occurred, (b) then the GNSS data has to be used as a measurement update in an update phase of the filter or state estimation technique for the state reached in the prediction of point (a) above, (c) then a series of prediction steps have to run using the remaining buffered sensors data starting from the second time epoch after the PPS and moving forward in time. This will continue until these prediction steps catch up with the other real-time prediction steps mentioned in point (i) above, in other words until the buffered sensor data used for this series of predictions catch up with the real-time sensor data.

When the two tasks mentioned in point (i) and (ii) above catch up together, the buffering of high rate sensor data will stop, and the system will perform the coming prediction step using the coming real-time sensor data, this prediction will start from the state that the moving object reached at the last prediction step from point (c) above. The navigation module will continue in real-time prediction steps on the incoming real-time sensors data afterward, and the above described scenario will repeat. It is to be noted that the estimated biases in the real-time prediction task (in point (i) above that will run after point (c)) will get enhanced when the update-based navigation task (in point (ii) above) catch up with the real-time navigation prediction task (in point (i) above) and be the basis of further real-time navigation prediction steps.

The delay of the GNSS data has to be handled by the application level software in a manner that can achieve the scenario described above, either through multi-tasking or by using a processor fast enough to process the new GNSS update and all backtracked predictions before new inertial data arrives in real-time; this second scenario would allow the use of only a single task and there will be no need for two separate tasks as in points (i) and (ii) above.

In the case that the processor is not fast enough to finish all the processing before new inertial data arrives in real-time, multi-tasking or interrupts will be needed. In the case of multi-tasking, potential tasks are as follows:

1. Data handler task: read high rate sensor data when available.

2. Navigation tasks: As per the description above this consist of two series of operations:

a. Real-time navigation prediction task: this task consists of a series of prediction steps of the filtering or state estimation technique. Each step in this task utilizes the sensor data only and is used to provide a real-time navigation solution while waiting for the GNSS data.

b. Background update-based navigation task: this task is delayed until all GNSS data from one time epoch at the GNSS-rate is received. The GNSS data is then time stamped back to the correct PPS time and the GNSS update is performed at this time using the state of the object at the PPS time which was already saved. The filter in this task then operates in prediction mode (a series of predictions) building on the updated state of the object using buffered sensor data since the last PPS) until it catches up with the real-time navigation prediction task (i.e. until both tasks operate on the same sensor data) and the system will merge the two series into one, which will be the real-time navigation but it will start from the last object's state reached in the background update-based navigation task.

The delay between the PPS pulse and the actual GNSS data availability is dependent on the GNSS receiver calculations, which is also related to the type of GNSS algorithm used (such as, for example, single point, differential, RTK, PPP, WAD), the data transfer protocol from the GNSS receiver (again dependent on receiver) until the processor that will run the navigation solution, this transfer can be direct between the two or otherwise another processor or microcontroller (for data acquisition) can be in between the two. In the latter case, there will be a data transfer from the GNSS receiver to the intermediate processor or microcontroller and another data transfer from the intermediate processor to the higher level processor that is running the navigation algorithm.

To give more insight about point 2 above:
A. From the PPS time until the GPS data reaches the higher level processor, the real-time solution is provided from the navigation prediction task.
B. When the GPS data is available to the higher level processor, two tasks run without hindering each other: (i) the navigation prediction task which still provides the real-time solution, (ii) the background update-based navigation task is run in the background (i.e. with its solution not provided to the outside as the real-time solution) until it catches up with the navigation prediction task.
C. When the two tasks overlap on the last sensor data that they processed (i.e. when the background update-based navigation task is able to catch up with the real-time navigation prediction task), the solution from the update-based navigation task will be fed as the last value from which the next iteration of the navigation prediction task will start. The solution from the newly initialized navigation prediction task is provided as the real-time solution until the next PPS arrives. Once, the PPS arrives the solution is provided by the navigation prediction thread mentioned in point A above (which is the straight continuation of the newly initialized navigation prediction task mentioned in this point), and so on.

If the processor performance does not allow the whole back-tracking calculation to be accomplished before new sensor data comes, and furthermore multi-tasking is not available (for example due to not using a multi-tasking OS, or a task manager), then the equivalent of the above described multi-tasking can be achieved by interrupts on the port that provides the sensor data. The data handler task, mentioned in step 1 above, can be implemented in the interrupt service routine (ISR) of the port together with the real-time navigation prediction task (mentioned in step 2a above). The real-time navigation prediction task inside the ISR will be run only when the last byte of a sensor packet is received. This covers the detailed steps A, B(i), and C above. The main code always takes the result of this real-time navigation prediction step (implemented in the interrupt service routine) and provides it as the real-time navigation solution. Step B(ii) will be implemented in the main code, it starts when the GNSS data arrives and continues until it catches up with the real-time navigation prediction task. Afterward, the following navigation prediction step (implemented in the interrupt service routine) will build upon the latest result of the update-based navigation task and not those of the former real-time navigation prediction.

Figure 2:
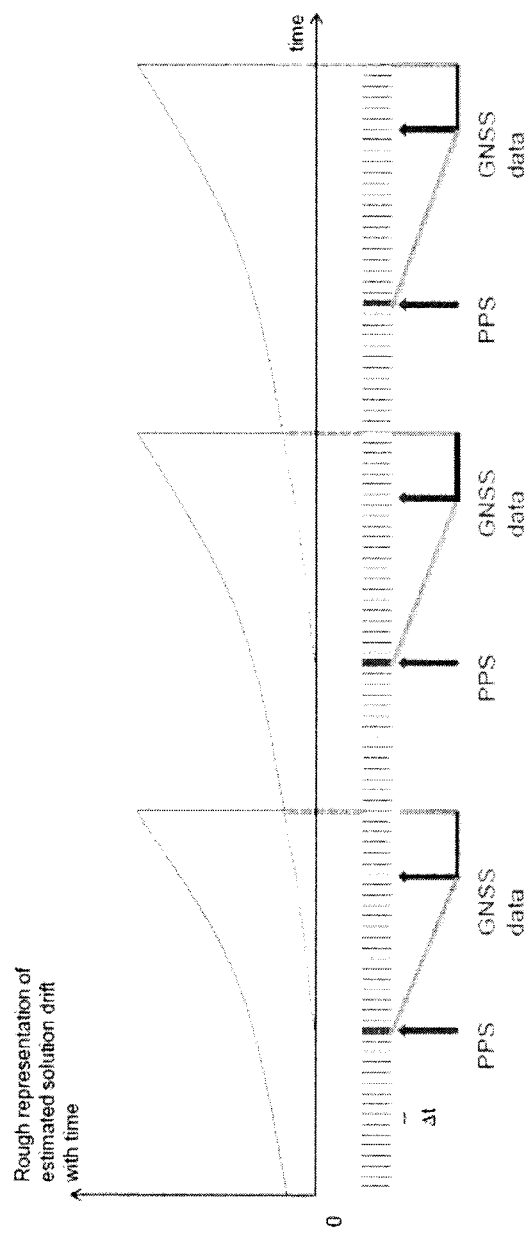
FIG. 2 shows a diagram depicting the high rate sensors readings of Example 1 herein, lower rate GNSS readings with their latency, and representation of estimated solution error.

FIG. 2 presents a timing diagram, of this example with GNSS readings rate at 1 Hz, showing the high rate sensors arriving periodically with intervals $\Delta t$, the PPS arriving periodically at 1 Hz, and the GPS data arriving later on because of the delays and latency discussed above. The real-time navigation prediction task is executed at the same rate at which the measurements from the high-rate sensors are acquired. The update-based navigation task is shown as a black line where the calculation using the buffered data (still growing until catch up happens) between the two green lines (from the tilted line until the vertical line) happens (this might be a separate task or happens very quickly before new high rate sensors data arrives if the processor is fast enough). The black line shows the execution time of this update-based navigation task. The dotted green line shows when the two solutions catch up to each other. The curve above the timing diagram roughly shows a representation of the errors of the provided real-time solution. It is to be noted that this error is theoretically about zero at the PPS time but this can't happen in real-time because the GNSS data arrives at the higher level processor later on as discussed earlier.

It is to be noted that the real-time navigation prediction task might run on one processor or core, while the update-based navigation task might run on another processor, another core, or another co-processor.

Example 2—Real-Time Navigation System with Higher Rate Attitude Outputs

In this example, the present navigation module operates to determine a real-time navigation solution by calculating position, velocity and attitude of a moving object, wherein the navigation module comprises absolute navigational information from a GNSS receiver, the self-contained sensors, and optionally the speed readings. In this example, the attitude solution is output in real-time at the highest rate provided by the gyroscopes, while position and velocity are output in real-time but at a relatively lower rate (might still be higher-rate compared to GNSS) provided by the accelerometers (or down sampled accelerometers). The GNSS data is received in the module at a lower rate and with a potential latency as discussed earlier.

An idea to achieve this is, whenever high rate gyroscopes readings are available, to run a real-time module that calculates the new attitude angles from the previous attitude angles and the gyroscope readings. This module may use one of several different techniques for attitude calculations, such as for example: a quaternion method, a direction cosine method, or Euler angles method. Either accelerometers readings are coming at a relatively lower rate than the gyroscopes or they are downsampled (for example by averaging) to a relatively lower rate than the gyroscopes. The state estimation or filtering technique will run a prediction phase to provide a real-time output for position, velocity and attitude at the accelerometer rate or the downsampled accelerometer rate. It is to be noted that the higher rate gyroscope readings (in addition to their original usage above) are also downsampled (for example by averaging) to the same rate of the accelerometers readings or the downsampled accelerometers readings, so that they can be used together in the prediction step of the state estimation technique or the filtering technique.

The above-mentioned steps will be used with the lower rate GNSS ideas mentioned in Example 1. The above-mentioned steps will replace the real-time navigation task of Example 1 by the more complicated hierarchy of tasks described above. The update-based navigation task of Example 1 is used in this example as well in the same manner, but the inertial data used are the downsampled gyroscope data in addition to either the original lower rate accelerometers data or the downsampled accelerometers data.

It is to be noted that the gyroscope sensor errors modeled and estimated by the state estimation or filtering technique, may be used to correct the high rate gyroscope data used for the high-rate real-time attitude module. The estimated error at the prediction rate will be used as is for the incoming gyroscope data at the higher rate, until the next prediction step is run. The estimated biases in the real-time navigation prediction task will be enhanced when the update-based navigation task catches up with the real-time navigation prediction task and will be the basis of further real-time navigation prediction steps.

Figure 3:
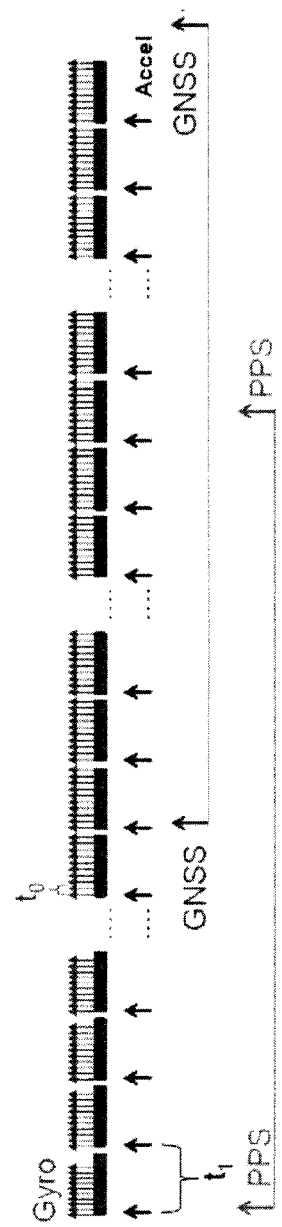
FIG. 3 shows a diagram depicting the high rate gyroscope readings of Example 2 herein, the relatively lower rate accelerometer or downsampled accelerometers readings, and the lower rate GNSS readings with their latency.
Figure 4:
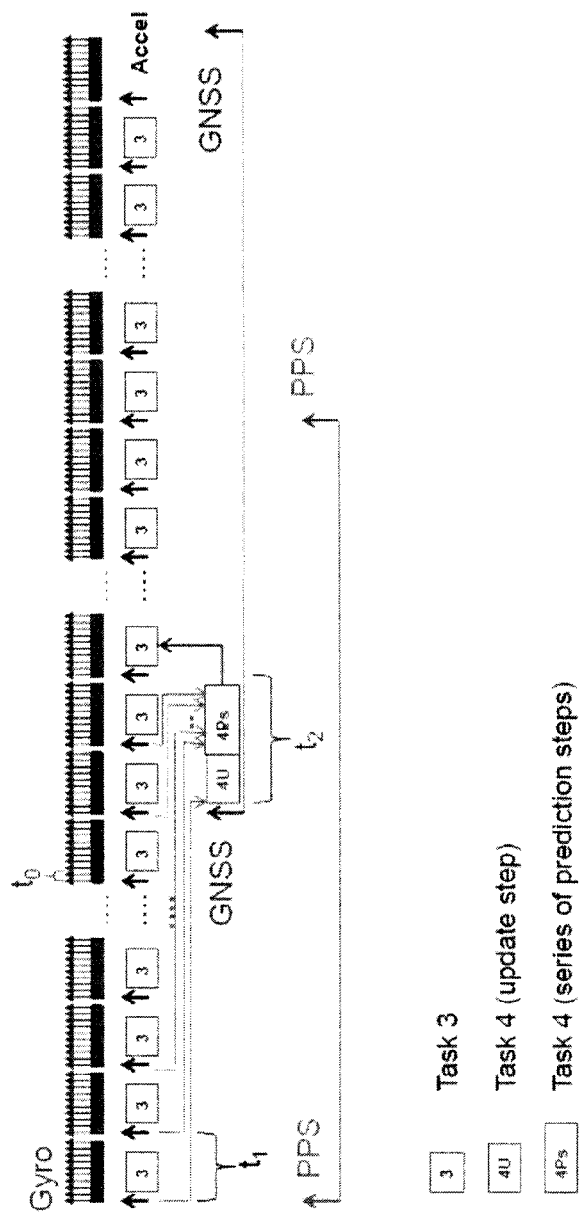
FIG. 4 shows a diagram depicting different readings of Example 2 and FIG. 3, together with the real-time navigation prediction task ("task 3") and the update-based navigation task ("task 4")
Figure 5:
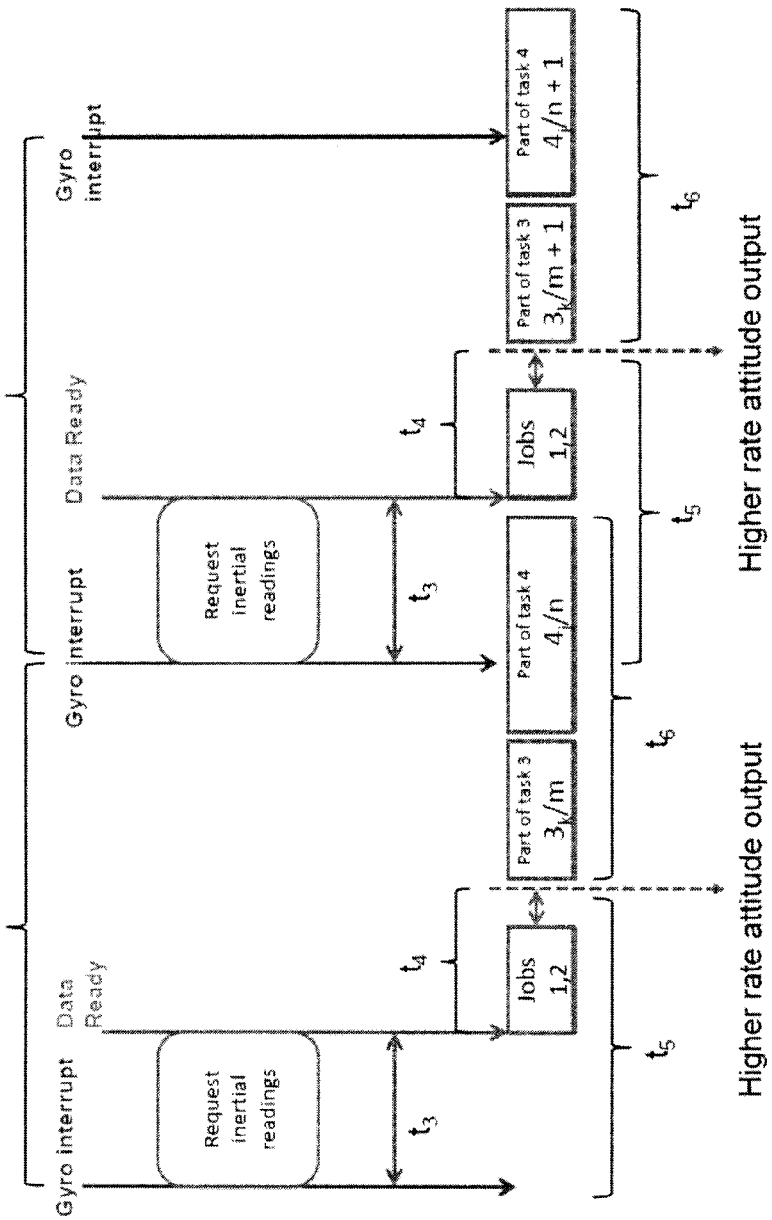
FIG. 5 shows an enhanced perspective of the high rate gyroscope readings of Example 2 (single processor case) having the high rate attitude calculation task ("job 1"), the downsampling of the high rate gyroscope readings ("job 2"), and portions of the real-time navigation prediction task ("task 3") and the update-based navigation task ("task 4")
Figure 6:
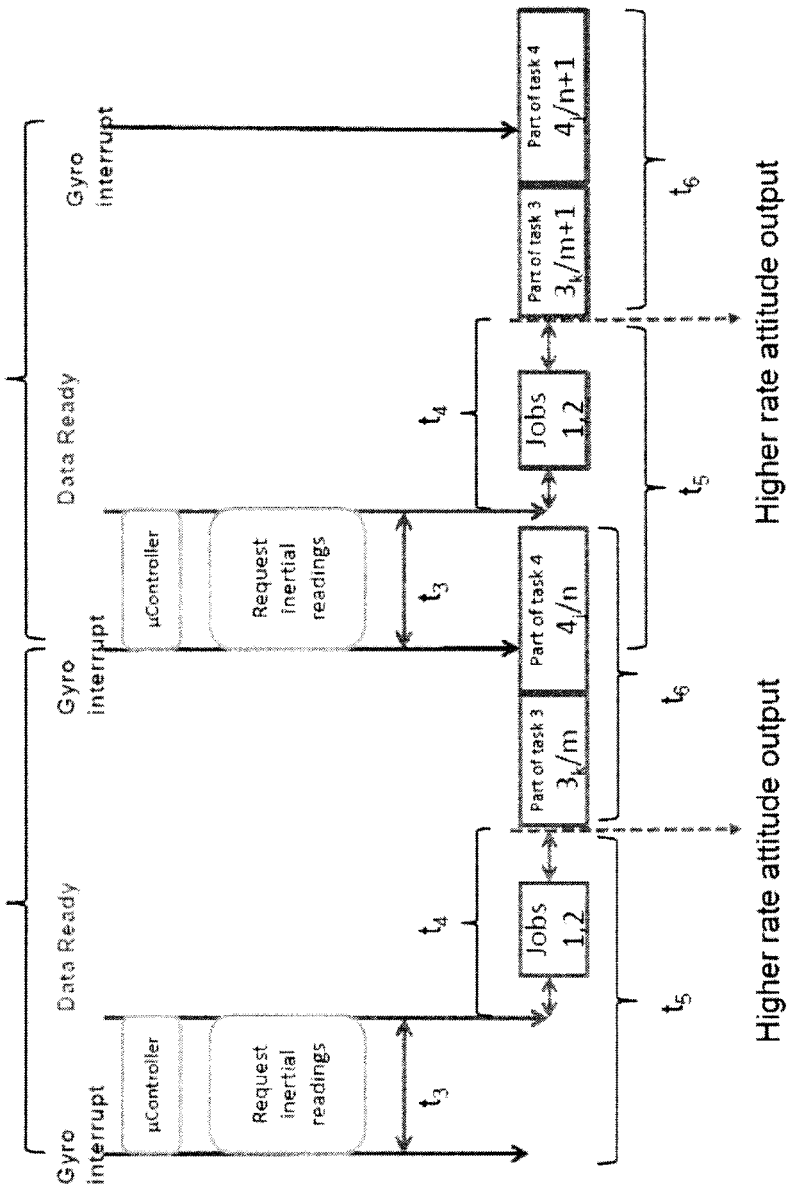
FIG. 6 shows an enhanced perspective of the high rate gyroscope readings of Example 2 (two processor case) showing the high rate attitude calculation task ("job 1"), the downsampling of the high rate gyroscope readings ("job 2"), and portions of the real-time navigation prediction task ("task 3") and the update-based navigation task ("task 4").

The operation of the above described navigation system is illustrated in FIG. 3. FIG. 4, FIG. 5, and FIG. 6. FIG. 3 is a diagram showing the high rate gyroscope readings, the relatively lower rate accelerometer or downsampled accelerometers readings, and the lower rate GNSS readings with their latency. FIG. 4 is a diagram showing the different readings in FIG. 3, together with the real-time navigation prediction task (labelled as "task 3") which is at the accelerometer rate or the downsampled accelerometer rate, and the update-based navigation task (labelled "task 4") which will start when the GNSS data arrives to the navigation processor and runs to catch up with the real-time navigation prediction task. FIG. 5 is a diagram showing a zoomed in perspective of the high rate gyroscope readings (in the single processor case) showing the high rate attitude calculation task (labelled as "job 1"), the downsampling of the high rate gyroscope readings (labelled as "job 2"), and portions of the real-time navigation prediction task (labelled as "task 3") and the update-based navigation task (labelled "task 4"). FIG. 6 is a diagram showing a zoomed in perspective of the high rate gyroscope readings (in the two processor case: one processor or microcontroller for sensors data acquisition and the other processor for processing the navigation solution) showing the high rate attitude calculation task (labelled as "job 1"), the downsampling of the high rate gyroscope readings (labelled as "job 2"), and portions of the real-time navigation prediction task (labelled as "task 3") and the update-based navigation task (labelled as "task 4").

In FIG. 4, the time $t_0$ is the sampling time of the high rate gyroscope readings; job 1 and job 2 have to finish much faster than this time. The time $t_1$ is the sampling time of the accelerometer readings or the downsampled accelerometers readings. One run of a full task 3 has to finish in less than $t_1$, even in much less time because there is other processing that will be running within this time as well, such as for example, job 1 and job 2 will run several times within $t_1$. The time $t_2$ is the time needed by task 4 to operate on all buffered data until it catches up with task 3. Whenever this time is smaller, the catch up will happen sooner and the error drift (such as the one roughly represented in FIG. 2) will be less.

In FIG. 5 and FIG. 6, the time $t_0$ (sampling time of the high rate gyroscope readings) is shown in a zoomed-in scenario, and the time $t_5$ is the time between the instant when the high rate gyroscopes raise an interrupt until the high rate attitude is output, so this time represents the latency in the real-time attitude solution. The time $t_6$ is the time slot where portions of task 3 and task 4 can run. Whenever time $t_6$ is larger, this gives more processor time to these two tasks, and this will help assure that task 3 is finished within the real-time requirements of time $t_1$ with the least possible latency in the real-time position and velocity output and will help task 4 to finish as quickly as possible by achieving the catch up with task 3.

In FIG. 5, which is for the single processor case, the time $t_3$ is the time taken by the processor (which is here the same processor that will run the navigation algorithms) to request and read the gyroscope readings (and possibly the accelerometers readings if they are originally at the same rate as the gyroscopes) and having them ready. The time $t_4$ is the time taken by the processor to run job 1, job 2, and output, or initiate the output operation of, the high rate attitude. The time $t_5$ is the sum of $t_3$ and $t_4$. The sum of $t_4$ and $t_6$ should not exceed $t_0$. The aim is to minimize $t_5$, which means minimizing the latency of the high rate attitude output, and maximizing $t_6$, which means giving more time to task 3 and task 4, to minimize the latency of the real-time output of task 3 and have a faster "catch up" of task 4 with task 3.

In FIG. 6, which is for the two processor case (one processor or microcontroller for sensors data acquisition and the other processor for processing the navigation solution), the time $t_3$ is the time taken by the first processor or microcontroller to request and read the gyroscope readings (and possibly the accelerometers readings if they are originally at the same rate as the gyroscopes) and having them ready for the second processor that will run the navigation solution. The time $t_4$ is the time taken by the second processor to read the data coming from the first processor, run job 1 and job 2, and output (or initiate the output operation of) the high rate attitude. The time $t_5$ is the sum of $t_3$ and $t_4$. The sum of $t_4$ and $t_6$ should not exceed $t_0$. The aim is to minimize $t_5$, which means minimizing the latency of the high rate attitude output, and maximize $t_6$, which means giving more time to task 3 and task 4, to minimize the latency of the real-time output of task 3 and have a faster "catch up" of task 4 with task 3.

It is to be noted that the different options and descriptions in Example 1 regarding the real-time navigation prediction task and the update-based navigation task, is applicable to task 3 and task 4 described above.

It is also to be noted that the real-time navigation prediction task (here task 3) together with the task containing jobs 1 and 2 might run on one processor or core, while the update-based navigation task (here task 4) might run on another processor, another core, or another co-processor.

Example 3—Real-Time Navigation System Benefiting from Computationally Complex Estimation Techniques In this example, the present navigation module operates to determine a real-time navigation solution by calculating position, velocity and attitude of a moving object, wherein the navigation module comprises absolute navigational information from a GNSS receiver, the self-contained sensors, and optionally the speed readings. The position, velocity and attitude are output in real-time at the high rate provided by the inertial sensors (such as in Example 1) or attitude is output at a higher rate compared to position and velocity (such as in Example 2). The GNSS data is received in the module at a lower rate and with a potential latency as discussed earlier.

In the case enhancing upon Example 1, A faster solution is running to provide the real-time output which is based on a filter or state estimation technique with less computational complexity such as, for example, KF-based solution, that operate to achieve the different tasks described in Example 1, while a more computationally complex solution and more accurate such as, for example, a PF-based solution is running at a lower rate on the same processor or on another processor (that can communicate with the first processor) and its output is providing lower-rate updates to the main solution (the less computationally expensive one). The other more complex and more accurate solution will benefit as well from the GNSS updates. Since this solution is not required to provide a real-time output, it does not necessarily need to operate in a manner described in Example 1, it still might do so or it might just buffer the high rate sensor data and operate on them in a manner like the update-based navigation task of Example 1. In one embodiment, the main solution might operate as described in Example 1 with the addition of the new update coming from the additional more complex and more accurate filter or state estimation technique with a latency. These updates will be dealt with in a similar manner to how GNSS updates (with a latency) are dealt with in Example 1. In another embodiment, the main solution might operate as described in Example 1 except for the part using GNSS updates with their latency, and instead use the updates coming from the additional more complex and more accurate filter or state estimation technique with a latency. These latter updates will be dealt with and with their latency in manner similar to the update-based navigation task of Example 1.

In the case enhancing upon Example 2, A faster solution is running to provide the real-time output which is based on both a higher rate attitude calculation module and a filter or state estimation technique with less complexity such as, for example, KF-based solution, that both operate to achieve the different tasks described in Example 2, while a more computationally complex solution and more accurate such as, for example, a PF-based solution is running at a lower rate on the same processor or on another processor (that can communicate with the first processor) and its output is providing lower-rate updates to the main solution (the less computationally expensive one). The other more complex and more accurate solution will benefit as well from the GNSS updates. Since this solution is not required to provide a real-time output, it does not necessarily need to operate in a manner described in Example 2, it still might do so or it might just buffer the high rate sensor data and operate on them in a manner like the update-based navigation task of Example 1 or Example 2. In one embodiment, the main solution might operate as described in Example 2 with the addition of the new update coming from the additional more complex and more accurate filter or state estimation technique with a latency. These updates will be dealt with in a similar manner to how GNSS updates (with a latency) are dealt with in Example 1 or Example 2. In another embodiment, the main solution might operate as described in Example 2 except for the part using GNSS updates with their latency, and instead use the updates coming from the additional more complex and more accurate filter or state estimation technique with a latency. These latter updates will be dealt with and with their latency in manner similar to the update-based navigation task of Example 1 and Example 2.

Example 4—Real-Time Navigation System Benefiting from Background Processing of a Backward Smoothed Solution In this example, the present navigation module operates to determine a real-time navigation solution by calculating position, velocity and attitude of a moving object, wherein the navigation module comprises absolute navigational information from a GNSS receiver, the self-contained sensors, and optionally the speed readings. The position, velocity and attitude are output in real-time at the high rate provided by the inertial sensors (such as in Example 1) or attitude is output at a higher rate compared to position and velocity (such as in Example 2). The GNSS data is received in the module at a lower rate and with a potential latency as discussed earlier. Furthermore this example can build upon the solution described in Example 3.

When enhancing upon Example 1, 2, or 3, the solution described in these examples (with the different hierarchy of details described in these examples) is running to provide the real-time output and the other underlying portions to achieve the different tasks described in Example 1, 2, or 3; while all the sensors readings, absolute navigation information, optional speed or velocity readings and all the real-time navigation results and parameters are saved. Every predetermined period of time the system will seek to run in the background a backward smoothed solution on the saved data. But at the moment of starting this backward smoothed solution good GNSS availability has to be there. If at the predetermined time to start this backward smoothed solution GNSS is not available or not adequate, the system waits until GNSS is available and adequate to start this backward smoothed solution. This background processing of the backward smoothed solution can be running either on the same processor as the main processing or on another processor that can communicate with the first processor and can read the saved data from a shared location. The outcome of the backward processing solution can benefit the real-time navigation solution in its future runs (i.e. real-time run after the background routine has finished running), for example, by having better estimates for the sensors errors.

In the case of enhancing upon Example 3, the backward smoothed solution might be based on either the less complex state estimation or filtering technique, the more complex one, or each of the less computationally complex and more computationally complex solution may have its corresponding backward smoothed solution.

Example 5—Real-Time Navigation System Benefiting from Background Processing of Methods for Tuning Parameters of the Estimation Technique in the Real-Time Navigation System In this example, the present navigation module operates to determine a real-time navigation solution by calculating position, velocity and attitude of a moving object, wherein the navigation module comprises absolute navigational information from a GNSS receiver, the self-contained sensors, and optionally the speed readings. The position, velocity and attitude are output in real-time at the high rate provided by the inertial sensors (such as in Example 1) or attitude is output at a higher rate compared to position and velocity (such as in Example 2). The GNSS data is received in the module at a lower rate and with a potential latency as discussed earlier. Furthermore this example can build upon the solution described in Example 3 or in Example 4.

When enhancing upon Example 1, 2, 3, or 4, the solution described in these examples, with the different hierarchy of details described in these examples, is running to provide the real-time output and the other underlying portions to achieve the different tasks described in Example 1, 2, 3 or 4; while all the sensors readings, absolute navigation information, optional speed or velocity readings and all the real-time navigation results are saved. In the background, a routine is run to simulate outages in the absolute navigational information and tune the parameters of another instance of the state estimation technique used for the real-time navigation solution in the main thread to optimize the accuracy and the consistency of the solution. The accuracy and consistency is assessed comparing the temporary background solution during the simulated outages to a reference solution. The reference solution may be one of the following examples: the absolute navigational information (e.g. GNSS), a forward integrated navigation solution integrating the available sensors with the absolute navigational information and possibly with the optional speed or velocity readings, a backward smoothed integrated navigation solution integrating the available sensors with the absolute navigational information and possibly with the optional speed or velocity readings. Furthermore, the reference solution (either one of the example options mentioned above) might use a less complex state estimation or filtering technique or a more complex one (the description of these two options was described earlier in Example 3).

In the case of enhancing upon Example 3 or enhancing upon Example 4 in case this latter enhances upon Example 3, the parameters to be tuned may be those of the less complex state estimation or filtering technique or the more complex one or both.

The background processing can be running either on the same processor as the real-time processing or on another processor that can communicate with the first processor and can read the saved data from a shared location. The outcome of the background processing solution can benefit the real-time navigation solution in its future run (i.e. real-time run after the background routine has finished running), for example, by having better values for the parameters of the forward state estimation technique used for navigation.

It should be noted that the different embodiments of the present module and method of obtaining a real-time navigation solution, either alone, together or in any combination thereof, provide means to improve the navigation solution.

The embodiments presented herein may be combined with any navigation solution independent of the type of the state estimation or filtering technique defined herein. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments in which an exclusive property or privilege is claimed are defined as follows:

1. A navigation module for providing an overall navigation solution that provides a real-time navigation output about a moving object, the module comprising: a receiver for receiving absolute navigational information about the object from an external source, and producing an output indicative thereof, an assembly of self-contained sensors configured to obtain readings relating to navigational information about the object, and producing readings indicative thereof, and at least one processor, coupled to receive the navigational output and the readings from the sensor assembly, and operative to provide the overall navigation solution consisting of multiple tasks comprising: a main navigation solution task, wherein the main navigation solution task output is the real-time navigation output, and at least one other task, wherein the at least one other task is used to enhance the overall navigation solution; wherein the at least one other task is selected from the group consisting of:

a. at least two other tasks comprising a buffering task and a GNSS update task, wherein the receiver further outputs a timing pulse signal corresponding to the absolute navigation information output, wherein the processor is further coupled to receive the timing pulse signal, having a pulse indicating when the absolute navigation output should have been received, wherein the absolute navigational output may be delayed compared to the pulse, wherein the buffering task buffers the state of the main navigation solution task when the pulse is received and the readings from the sensor assembly, wherein the buffering of the readings from the sensor assembly begins when the pulse is received, and wherein the GNSS update task utilizes the buffered sensor readings until the GNSS update task synchronizes in time with the main navigation solution task, and merges therewith to enhance the main navigation solution task;

b. a higher rate attitude task configured to calculate attitude angles about the object at a higher rate than the main navigation solution task, wherein the main navigation solution task is based at least in part on the readings from the sensor assembly;

c. a lower rate navigation solution task that is more computationally complex and more accurate than the main navigation solution task, and used to enhance the main navigation solution task, wherein the main navigation solution task and the lower rate navigation solution task are both based at least in part on the sensor readings and wherein at least some quantities comprised in the main navigation solution task and at least some quantities comprised in the lower rate navigation solution task are the same navigation solution quantities;

d. at least two other tasks comprising a buffering task, wherein the buffering task buffers the absolute navigation information output, the readings from the sensor assembly and the output of the main navigation solution task, and a backward smoothing solution task that uses the buffered information to provide a backward smoothed solution to enhance the main navigation solution task; and e. at least two other tasks comprising a buffering task and a tuning routine task, wherein the buffering task buffers the absolute navigation information output, the readings from the sensor assembly and the output of the main navigation solution task, wherein the main navigation solution task runs a state estimation technique in a first instance, and wherein the tuning routine task uses the buffered information to tune parameters of the state estimation technique in a second instance, and then supplants the tuned parameters into the state estimation technique in the first instance to enhance the main navigation solution task.

2. The navigation module in claim 1, wherein the receiver for receiving absolute navigational information is a GNSS receiver.

3. The navigation module in claim 1, wherein the moving object is tethered or non-tethered to a moving platform.

4. The navigation module in claim 3, wherein the moving platform is a vehicle, a vessel or a person.

5. A navigation module for providing an overall navigation solution that provides a real-time navigation output about a moving object, the module comprising: a receiver for receiving absolute navigational information about the object from an external source, and producing a navigational output indicative thereof and a corresponding timing pulse signal, an assembly of self-contained sensors configured to obtain readings relating to navigational information about the object, and producing readings indicative thereof, at least one processor, coupled to receive i. the pulse signal, having a pulse indicating when the absolute navigation output should have been received, ii. the absolute navigational output, which may be delayed compared to the pulse, and iii. the readings from the sensor assembly, and operative to provide the overall navigation solution consisting of multiple tasks comprising: a main navigation solution task, wherein the main navigation solution task output is the real time navigation output, and at least two other tasks, wherein the at least two other tasks comprise a buffering task that buffers the state of the main navigation solution task when the pulse is received and the readings from the sensor assembly, wherein the buffering of the readings from the sensor assembly begins when the pulse is received, and a GNSS update task, wherein the GNSS update task utilizes the buffered sensor readings until the GNSS update task synchronizes in time with the main navigation solution task, and merges therewith to enhance the main navigation solution task, thereby enhancing the overall navigation solution.

6. The navigation module in claim 5, wherein the receiver for receiving absolute navigational information is a GNSS receiver.

7. The navigation module in claim 5, wherein the moving object is tethered or non-tethered to a moving platform.

8. The navigation module in claim 7, wherein the moving platform is a vehicle, a vessel or a person.

9. A navigation module for providing an overall navigation solution that provides a real-time navigation output about a moving object, the module comprising: a receiver for receiving absolute navigational information about the object from an external source, and producing a navigational output indicative thereof, an assembly of self-contained sensors configured to obtain readings relating to navigational information about the object, and producing readings indicative thereof, at least one processor, coupled to receive i. the absolute navigational information output, ii. the readings from the sensor assembly, and operative to provide the overall navigation solution consisting of multiple tasks comprising: a main navigation solution task, wherein the main navigation solution task output is the real-time navigation output and is based at least in part on the readings from the sensor assembly, and at least one other task, wherein the at least one other task comprises a higher rate attitude task configured to calculate attitude angles about the object at a higher rate than the main navigation solution task, thereby providing an enhanced overall navigation solution.

10. The navigation module in claim 9, wherein the receiver for receiving absolute navigational information is a GNSS receiver.

11. The navigation module in claim 9, wherein the moving object is tethered or non-tethered to a moving platform.

12. The navigation module in claim 11, wherein the moving platform is a vehicle, a vessel or a person.

13. The navigation module in claim 9, wherein the readings from the sensor assembly include readings from at least one gyroscope.

14. The navigation module in claim 13, wherein the readings from the sensor assembly include readings from three gyroscopes.

15. The navigation solution of claim 13, wherein the processor is programmed to utilize the gyroscope readings to calculate the higher rate attitude.

16. A navigation module for providing an overall navigation solution that provides a real-time navigation output about a moving object, the module comprising: a receiver for receiving absolute navigational information about the object from an external source, and producing a navigational output indicative thereof, an assembly of self-contained sensors configured to obtain readings relating to navigational information about the object, and producing readings indicative thereof, at least one processor, coupled to receive i. the absolute navigational information output, ii. the readings from the sensor assembly, and operative to provide the overall navigation solution consisting of multiple tasks comprising: a main navigation solution task, wherein the main navigation solution task output is the real-time navigation output, and at least one other task, wherein the at least one other task comprises a lower rate navigation solution task that is more computationally complex and more accurate than the main navigation solution task, and used to enhance the main navigation solution task, thereby enhancing the overall navigation solution, wherein the main navigation solution task and the at least one other task are both based at least in part on the readings from the sensor assembly and wherein at least some quantities comprised in the main navigation solution task and at least some quantities comprised in the lower rate navigation solution task are the same navigation solution quantities.

17. The navigation module in claim 16, wherein the receiver for receiving absolute navigational information is a GNSS receiver.

18. The navigation module in claim 16, wherein the moving object is tethered or non-tethered to a moving platform.

19. The navigation module in claim 18, wherein the moving platform is a vehicle, a vessel or a person.

20. The navigation module in claim 16, wherein the main navigation solution task runs a Kalman filter based state estimation technique.

21. The navigation module in claim 16, wherein the lower navigation solution task runs a Particle filter based state estimation technique.

22. The navigation module of claim 16, wherein the multiple tasks further comprises one set of tasks from the following: a. a buffering task, wherein the buffering task buffers the absolute navigation information output, the readings from the sensor assembly and the output of the main navigation solution task, and a backward smoothing solution task that uses the buffered information to provide a backward smoothed solution to enhance the main navigation solution task, thereby providing an enhanced overall navigation solution, b. a buffering task, wherein the buffering task buffers the absolute navigation information output, the readings from the sensor assembly and the output of the lower rate navigation solution task, and a backward smoothing solution task that uses the buffered information to provide a backward smoothed solution to enhance the lower rate navigation solution task, thereby enhancing the main navigation solution task, and thereby providing an enhanced overall navigation solution, or c. a buffering task, wherein the buffering task buffers the absolute navigation information output, the readings from the sensor assembly, the output of the main navigation solution task, and the output of the lower rate navigation solution task, and a backward smoothing solution task that uses the buffered information to provide a backward smoothed solution to enhance the main navigation solution task, a backward smoothing solution task that uses the buffered information to provide a backward smoothed solution to enhance the lower rate navigation solution task, thereby further enhancing the main navigation solution task, wherein the combined enhancements to the main navigation solution task provide an enhanced overall navigation solution.

23. The navigation module in claim 22, wherein the receiver for receiving absolute navigational information is a GNSS receiver.

24. The navigation module in claim 22, wherein the moving object is tethered or non-tethered to a moving platform.

25. The navigation module in claim 24, wherein the moving platform is a vehicle, a vessel or a person.

26. The navigation module of claim 16, wherein the main navigation solution task runs a computationally efficient state estimation technique in a first instance, and the lower rate navigation solution task runs a computationally complex state estimation technique in a first instance, and wherein the multiple tasks further comprise one set of tasks from the following: a. a buffering task, wherein the buffering task buffers, the absolute navigation information output, the readings from the sensor assembly and the output of the main navigation solution task, and a tuning routine task that uses the buffered information to tune parameters of the computationally efficient state estimation technique in a second instance, then supplants the tuned parameters into the computationally efficient state estimation technique in the first instance to enhance the main navigation solution task, thereby enhancing the overall navigation solution, b. a buffering task, wherein the buffering task buffers the absolute navigation information output, the readings from the sensor assembly and the output of the lower rate navigation solution task, and a tuning routine task that uses the buffered information to tune parameters of the computationally complex state estimation technique in a second instance, then supplants the tuned parameters into the computationally complex state estimation technique in the first instance to enhance the main navigation solution task, thereby enhancing the overall navigation solution, or c. a buffering task, wherein the buffering task buffers the absolute navigation information output, the readings from the sensor assembly, the output of the main navigation solution task, and the output of the lower rate navigation solution task, and a tuning routine task that uses the buffered information to tune parameters of the computationally efficient state estimation technique in a second instance, then supplants the tuned parameters into the computationally efficient state estimation technique in the first instance to enhance the main navigation solution task, a tuning routine task that uses the buffered information to tune parameters of the computationally complex state estimation technique in a second instance, then supplants the tuned parameters into the computationally complex state estimation technique in the first instance to enhance the main navigation solution task, wherein the combined enhancements to the main navigation solution task provide an enhanced overall navigation solution.

27. The navigation module in claim 26, wherein the receiver for receiving absolute navigational information is a GNSS receiver.

28. The navigation module in claim 26, wherein the moving object is tethered or non-tethered to a moving platform.

29. The navigation module in claim 28, wherein the moving platform is a vehicle, a vessel or a person.

30. A navigation module for providing an overall navigation solution that provides a real-time navigation output about a moving object, the module comprising: a receiver for receiving absolute navigational information about the object from an external source, and producing a navigational output indicative thereof, an assembly of self-contained sensors configured to obtain readings relating to navigational information about the object, and producing readings indicative thereof, at least one processor, coupled to receive i. the absolute navigational information output, ii. the readings from the sensor assembly, and operative to provide the overall navigation solution consisting of multiple tasks comprising: a main navigation solution task, wherein the main navigation solution task output is the real-time navigation output, and at least two other tasks, wherein the at least two other tasks comprise a buffering task, wherein the buffering task buffers the absolute navigation information output, the readings from the sensor assembly and the output of the main navigation solution task, and a backward smoothing solution task that uses the buffered information to provide a backward smoothed solution to enhance the main navigation solution task, thereby providing an enhanced overall navigation solution.

31. The navigation module in claim 30, wherein the receiver for receiving absolute navigational information is a GNSS receiver.

32. The navigation module in claim 30, wherein the moving object is tethered or non-tethered to a moving platform.

33. The navigation module in claim 32, wherein the moving platform is a vehicle, a vessel or a person.

34. A navigation module for providing an overall navigation solution that provides a real-time navigation output about a moving object, the module comprising: a receiver for receiving absolute navigational information about the object from an external source, and producing a navigational output indicative thereof, an assembly of self-contained sensors configured to obtain readings relating to navigational information about the object, and producing readings indicative thereof, at least one processor, coupled to receive i. the absolute navigational information output, ii. the readings from the sensor assembly, and operative to provide the overall navigation solution consisting of multiple tasks comprising: a main navigation solution task, wherein the main navigation solution task runs a state estimation technique in a first instance, and the main navigation solution output is the real-time navigation output, and at least two other tasks, wherein the at least two other tasks comprise a buffering task, wherein the buffering task buffers the absolute navigation information output, the readings from the sensor assembly and the output of the main navigation solution task, and a tuning routine task that uses the buffered information to tune parameters of the state estimation technique in a second instance, and then supplants the tuned parameters into the state estimation technique in the first instance to enhance the main navigation solution task, thereby enhancing the overall navigation solution.

35. The navigation module in claim 34, wherein the receiver for receiving absolute navigational information is a GNSS receiver.

36. The navigation module in claim 34, wherein the moving object is tethered or non-tethered to a moving platform.

37. The navigation module in claim 36, wherein the moving platform is a vehicle, a vessel or a person.

38. The navigation module in any of claim 5, 9, 16, 30, 22, 34, or 26 to provide an enhanced overall navigation solution.

39. The navigation module in any of claim 5, 9, 16, 30, 22, 34, or 26, wherein the module has a means to obtain speed readings about the moving object using wired or wireless communication.

40. A method for providing an overall navigation solution that provides a real-time navigation output about a moving object, the method comprising:
  receiving absolute navigational information about the object from an external source and producing output readings indicative thereof,
  obtaining readings relating to navigational information about the object from an assembly of self-contained sensors and producing an output indicative thereof, and
  processing the absolute navigational information and the readings from the sensor assembly to provide an overall navigation solution consisting of multiple tasks comprising: a main navigation solution task, wherein the main navigation solution task output is the real-time navigation output, and at least one other task, wherein the at least one other task is used to enhance the overall navigation solution, and wherein the at least one other task is selected from the group consisting of:
    a. at least two other tasks comprising a buffering task and a GNSS update task, further comprising receiving a timing pulse signal corresponding to the absolute navigation information output from the external source, wherein the timing pulse signal has a pulse indicating when the absolute navigation output readings should have been received when the absolute navigational output readings may be delayed compared to the pulse, wherein the buffering task buffers the state of the main navigation solution task when the pulse is received and the readings from the sensor assembly, wherein the buffering of the readings from the sensor assembly begins when the pulse is received, and wherein the GNSS update task utilizes the buffered sensor readings until the GNSS update task synchronizes in time with the main navigation solution task, and merges therewith to enhance the main navigation solution task;
    b. a higher rate attitude task configured to calculate attitude angles about the object at a higher rate than the main navigation solution task, wherein the main navigation solution task is based at least in part on the readings from the sensor assembly;
    c. a lower rate navigation solution task that is more computationally complex and more accurate than the main navigation solution task, and used to enhance the main navigation solution task, wherein the main navigation solution task and the lower rate navigation solution task are both based at least in part on the sensor readings and wherein at least some quantities comprised in the main navigation solution task and at least some quantities comprised in the lower rate navigation solution task are the same navigation solution quantities;
    d. at least two other tasks comprising a buffering task, wherein the buffering task buffers the absolute navigation information output, the readings from the sensor assembly and the output of the main navigation solution task, and a backward smoothing solution task that uses the buffered information to provide a backward smoothed solution to enhance the main navigation solution task; and
    e. at least two other tasks comprising a buffering task and a tuning routine task, wherein the buffering task buffers the absolute navigation information output, the readings from the sensor assembly and the output of the main navigation solution task, wherein the main navigation solution task runs a state estimation technique in a first instance, and wherein the tuning routine task uses the buffered information to tune parameters of the state estimation technique in a second instance, and then supplants the tuned parameters into the state estimation technique in the first instance to enhance the main navigation solution task.

41. A method for providing an overall navigation solution that provides a real-time navigation output about a moving object, the method comprising:
  receiving absolute navigational information about the object from an external source and producing a navigational output indicative thereof and a corresponding timing pulse signal, wherein the absolute navigational information is delayed compared to the pulse signal, and the pulse signal comprises a pulse indicating when the absolute navigational output should have been provided,
  obtaining readings relating to navigational information about the object from an assembly of self-contained sensors and producing an output indicative thereof, and
  processing the pulse signal, the absolute navigational information and the readings from the sensor assembly to provide an overall navigation solution consisting of multiple tasks comprising: a main navigation solution task, wherein the main navigation solution task output is the real time navigation output, and at least two other tasks, wherein the at least two other tasks comprise a buffering task that buffers the state of the main navigation solution task when the pulse is received and the readings from the sensor assembly, wherein the buffering of the readings from the sensor assembly begins when the pulse is received, and a GNSS update task, wherein the GNSS update task utilizes the buffered sensor readings until the GNSS update task synchronizes in time with the main navigation solution task, and merges therewith to enhance the main navigation solution task, thereby enhancing the overall navigation solution.

42. A method for providing an overall navigation solution that provides a real-time navigation output about a moving object, the method comprising:
  receiving absolute navigational information about the object from an external source and producing an output indicative thereof,
  obtaining readings relating to navigational information about the object from an assembly of self-contained sensors and producing an output indicative thereof, and
  processing the absolute navigational information and the readings from the sensor assembly to provide an overall navigation solution consisting of multiple tasks, comprising: a main navigation solution task, wherein the main navigation solution task output is the real-time navigation output and is based at least in part on the readings from the sensor assembly, and at least one other task, wherein the at least one other task comprises a higher rate attitude task to calculate attitude angles about the object at a higher rate than the main navigation solution task, thereby providing an enhanced overall navigation solution.

43. A method for providing an overall navigation solution that provides a real-time navigation output about a moving object, the method comprising:
receiving absolute navigational information about the object from an external source and producing an output indicative thereof,
obtaining readings relating to navigational information about the object from an assembly of self-contained sensors and producing an output indicative thereof, and
processing the absolute navigational information and sensor assembly readings to provide an overall navigation solution consisting of multiple tasks, comprising: a main navigation solution task, wherein the main navigation solution task output is the real-time navigation output, and at least one other task, wherein the at least one other task comprises a lower rate navigation solution that is more computationally complex and more accurate than the main navigation solution task, and used to enhance the main navigation solution task, thereby enhancing the overall navigation solution, wherein the main navigation solution task and the at least one other task are both based at least in part on the sensor readings and wherein at least some quantities comprised in the main navigation solution task and at least some quantities comprised in the lower rate navigation solution task are the same navigation solution quantities.

44. The method of claim 43, wherein the multiple tasks further comprise one set of tasks from the following:
a. a buffering task, wherein the buffering task buffers the absolute navigation information output, the readings from the sensor assembly and the output of the main navigation solution task, and a backward smoothing solution task that uses the buffered information to provide a backward smoothed solution to enhance the main navigation solution task, thereby providing an enhanced overall navigation solution,
b. a buffering task, wherein the buffering task buffers the absolute navigation information output, the readings from the sensor assembly and the output of the lower rate navigation solution task, and a backward smoothing solution task that uses the buffered information to provide a backward smoothed solution to enhance the lower rate navigation solution task, thereby enhancing the main navigation solution task, and thereby providing an enhanced overall navigation solution or
c. a buffering task, wherein the buffering task buffers the absolute navigation information output, the readings from the sensor assembly, the output of the main navigation solution task, and the output of the lower rate navigation solution task, and a backward smoothing solution task that uses the buffered information to provide a backward smoothed solution to enhance the main navigation solution task, a backward smoothing solution task that uses the buffered information to provide a backward smoothed solution to enhance the lower rate navigation solution task, thereby further enhancing the main navigation solution task, wherein the combined enhancements to the main navigation solution task provide an enhanced overall navigation solution.

45. The method of claim 43, wherein the main navigation solution task runs a computationally efficient state estimation technique in a first instance, and the lower rate navigation solution task runs a computationally complex state estimation technique in a first instance, and wherein the multiple tasks further comprise one set of tasks from the following:
a. a buffering task, wherein the buffering task buffers the absolute navigation information output, the readings from the sensor assembly and the output of the main navigation solution task, and a tuning routine task that uses the buffered information to tune parameters of the computationally efficient state estimation technique in a second instance, then supplants the tuned parameters into the computationally efficient state estimation technique in the first instance to enhance the main navigation solution, thereby enhancing the overall navigation solution,
b. a buffering task, wherein the buffering task buffers the absolute navigation information output, the readings from the sensor assembly and the output of the lower rate navigation solution task, and a tuning routine task that uses the buffered information to tune parameters of the computationally complex state estimation technique in a second instance, then supplants the tuned parameters into the computationally complex state estimation technique in the first instance to enhance the main navigation solution task, thereby enhancing the overall navigation solution, or
c. a buffering task, wherein the buffering task buffers the absolute navigation information output, the readings from the sensor assembly, the output of the main navigation solution task, and the output of the lower rate navigation solution task, and a tuning routine task that uses the buffered information to tune parameters of the computationally efficient state estimation technique in a second instance, then supplants the tuned parameters into the computationally efficient state estimation technique in the first instance to enhance the main navigation solution task, a tuning routine task that uses the buffered information to tune parameters of the computationally complex state estimation technique in a second instance, then supplants the tuned parameters into the computationally complex state estimation technique in the first instance to enhance the main navigation solution task, wherein the combined enhancements to the main navigation solution task provide an enhanced overall navigation solution.

46. A method for providing an overall navigation solution that provides a real-time navigation output about a moving object, the method comprising:
receiving absolute navigational information about the object from an external source and producing an output indicative thereof,
obtaining readings relating to navigational information about the object from an assembly of self-contained sensors and producing an output indicative thereof, and
processing the absolute navigational information and the readings from the sensor assembly to provide the overall navigation solution consisting of multiple tasks, comprising: a main navigation solution task, wherein the main navigation solution task output is the real-time navigation output, and at least two other tasks, wherein the at least two other tasks comprise a buffering task, wherein the buffering task buffers the absolute navigation information, the readings from the sensor assembly and the output of the main navigation solution task, and a backward smoothing solution task that uses the buffered information to provide a backward smoothed solution to enhance the main navigation solution task, thereby providing an enhanced overall navigation solution.

47. A method for providing an overall navigation solution that provides a real-time navigation output about a moving object, the method comprising:

receiving absolute navigational information about the object from an external source and producing an output indicative thereof, obtaining readings relating to navigational information about the object from an assembly of self-contained sensors and producing an output indicative thereof, and processing the absolute navigational information and the readings from the sensor assembly to provide the overall navigation solution consisting of multiple tasks, comprising: a main navigation solution task, wherein the main navigation task uses a state estimation technique in a first instance, and provides the real-time navigation output, and at least one other task, wherein the other task comprises at least a buffering task, wherein the buffering task buffers the absolute navigation information output, the readings from the sensor assembly and the output of the main navigation solution task, and a tuning routine task that uses the buffered information to tune parameters of the state estimation technique in a second instance, then supplants the tuned parameters into the state estimation technique in the first instance to enhance the main navigation solution task, thereby enhancing the overall navigation solution.

\* \* \* \* \*